United States Patent [19]

Goldman

[11] Patent Number: 5,770,077
[45] Date of Patent: Jun. 23, 1998

[54] LAMINATED FILTER MATERIAL

[75] Inventor: Sidney Goldman, Boca Raton, Fla.

[73] Assignee: Mechanical Manufacturing Corp., Sunrise, Fla.

[21] Appl. No.: 642,922

[22] Filed: May 6, 1996

Related U.S. Application Data

[63] Continuation of Ser. No. 331,267, Oct. 24, 1994, abandoned.

[51] Int. Cl.$^6$ .................................................. B01D 39/16
[52] U.S. Cl. ................. 210/490; 210/497.01; 210/497.2; 156/219; 156/222; 156/290
[58] Field of Search ..................................... 210/489, 490, 210/232, 448, 452, 447.01, 497.2; 156/219, 222, 290

[56] References Cited

U.S. PATENT DOCUMENTS

| 4,604,203 | 8/1986 | Kyle ........................................ 210/489 |
| 4,910,064 | 3/1990 | Sabee ..................................... 156/293 |
| 4,921,606 | 5/1990 | Goldman ................................ 210/238 |
| 4,983,292 | 1/1991 | Morgan, Jr. ............................ 210/491 |
| 4,983,434 | 1/1991 | Sassa ...................................... 428/36.2 |
| 5,246,581 | 9/1993 | Goldman ................................ 210/452 |
| 5,417,678 | 5/1995 | Baumann et al. ..................... 604/333 |
| 5,609,761 | 3/1997 | Franz ..................................... 210/493.1 |

*Primary Examiner*—W. L. Walker
*Attorney, Agent, or Firm*—Martin Sachs, Esq.

[57] ABSTRACT

A laminated filter material may be used in seamless filter bags in order to increase the strength and filtering ability of a pressurized filter system.

23 Claims, 1 Drawing Sheet

LAMINATED FILTER MATERIAL

The present application is a continuation of application Ser. No. 08/331,267 filed Oct. 24, 1994 now abandoned by the same inventor.

SPECIFICATIONS

1. Field of the Invention

The present invention generally relates to seamless filter bags, and more particularly, relates to a laminated filter material (media) utilized in a seamless filter bag, which includes a semi-rigid ring portion to which the laminated material is affixed without the use of piercing the ring or the laminated filter material.

2. Discussion of the Relevant Art

A typical pressurized filter system utilizes a housing into which is inserted a filter basket and, in turn, a filter bag is placed in the basket. The filter basket is utilized to increase the strength of the filter bag so that when particulates are filtered from the liquid or gas flowing therethrough, it helps to prevent the filter bag from rupturing. Typical of the systems utilized is disclosed in U.S. Pat. No. 5,246,581, issued to Sidney Goldman on Sep. 21, 1993.

This type of filter bag was a major improvement in pressurized filtering techniques, since the filter bag was constructed without any piercing holes, such as caused by stitching the filter material to form a filter bag. In addition, it was necessary to affix the bag to an upper or ring portion, which permitted the bag to sit in the filter basket without allowing fluid to flow therearound, thereby preventing the particulate being filtered from the fluid to pass down stream. The ring portion of the filter bags disclosed therein has the additional feature of providing a seal when the cover of the filter housing was closed after the filter bag and basket was placed therein.

Although this type of filter was a major advancement in the art, it still contained the shortcoming of being limited by the size of particle that could be filtered from the fluid flowing therethrough, and when sufficient particles were caught in the filter bag, the pressure in the system would build and thus the possibility of fracturing the filter media of the filter bag was ever present. The entire patent referred to above is incorporated herein in its entirety, as if set forth at length.

The present invention overcomes the shortcomings disclosed in the prior art by providing a seamless filter bag that utilizes a laminated filter material or media that has increased strength and can remove particles of a much smaller size from a fluid flowing therethrough. This is accomplished by utilizing a laminated filter material or media, which is affixed to the ring portion of the filter bag by a method, which utilizes heat to both affix the bag to the ring and to laminate multiple layers of the filter material, having different consistencies such as porosity and strength.

Therefore, it is an object of the present invention to provide a seamless filter bag assembly having no piercing apertures therein and is sealed and affixed to its ring portion utilizing a heat procedure.

It is another object of the present invention to provide a filter media which, when assembled, is capable of filtering out smaller particulates from a fluid flowing therethrough and has increased strength.

It is yet another object of the present invention to provide a filter bag that may consist of a plurality of filter layers, with each filter layer selectively chosen to filter out particulates having a specific size.

It is still yet another object of the present invention to provide a filter bag, which is economical and suitable for fabrication by an automatable process.

Other objects and advantages will become apparent by users acquainted with systems of this type upon reading the following specifications and reviewing the accompanying drawings.

SUMMARY OF THE INVENTION

A seamless filter bag, according to the principles of the present invention, includes multi-layered laminated filter material (media) affixed to a filter ring portion, with the attachment to the filter ring portion being accomplished by utilizing heat to laminate the material and affix the filter material to the filter ring portion.

The foregoing and other objects and advantages will appear from the description to follow. In the description reference is made to the accompanying drawing, which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the spirit and scope of the invention. The following detailed description is, therefore, not to be taken in a limiting sense, and the scope of the present invention is best defined by the appended claims.

The subject matter which I regard as my invention is particularly pointed out and distinctly claimed at the concluding portion of the specification. My invention, itself, however both as to its organization and method of operation, together with further objects and advantages thereof may best be understood by reference of the following description taken in connection with the accompanying drawing.

BRIEF DESCRIPTION OF THE DRAWING

In order that the invention may be more fully understood, it will now be described, by way of example, with reference to accompanying drawing in which.

DESCRIPTION OF THE PREFERRED EMBODIMENT

Figure 1:
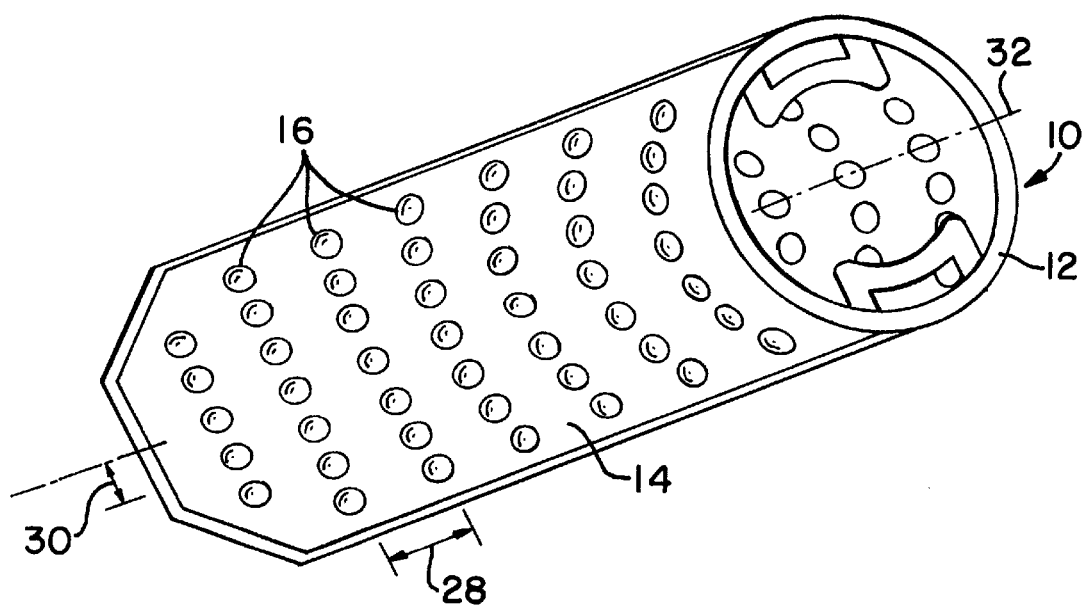
FIG. 1 is a perspective view, according to the principles of the present invention, of a laminated filter bag including the laminated filter material affixed to a ring portion, which has been attached with heat techniques.

Referring now to the figures, and in particular to FIG. 1, there is shown a filter bag 10 that includes a ring portion 12 made of semi-rigid material, eg. polypropylene, polyester, nylon; same material as filter media, onto which is affixed the laminated filter material or media 14. The filter bag 10 is similar to that described in the patent to Goldman ('581) and is described therein in detail and has been incorporated herein by reference. A distinguishing feature herein is that the filter material or media 14 has been laminated to increase its strength and filtering capability.

The filter media includes a plurality of dimples 16, disposed throughout the length and width of the media, which is applied thereto by a heat welding process and is described in detail hereinafter.

Figure 2:
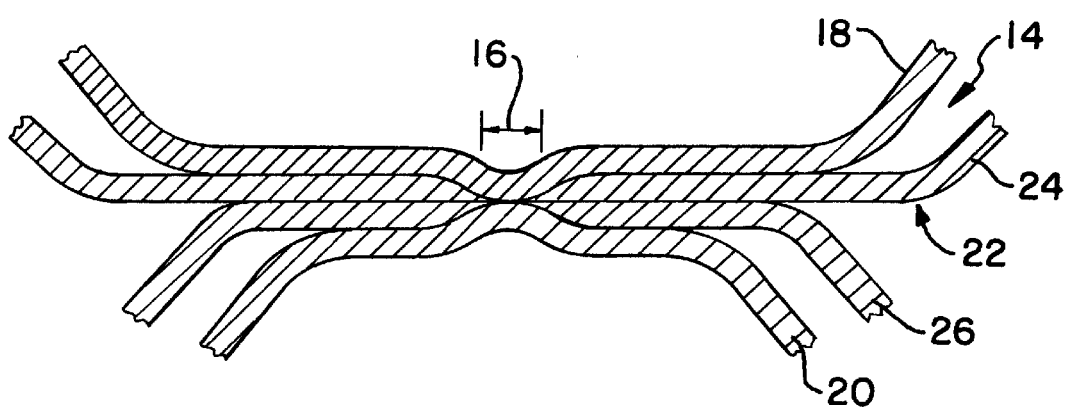
FIG. 2 is a greatly enlarged cross-section of the laminated filter material or media, which is affixed to the filter bag ring portion.

FIG. 2 is a greatly enlarged cross-sectional view of the filter material or media wherein the dimples 16 are provided on the filter material 14 as shown, and is preferably of generally circular configuration, having a diameter of approximately ¼ of an inch (0.635 cm) and can be seen to crush the outer layer of the media 18 as well as the inner layer or layers 22 of the filter media. Although four layers of material are depicted in FIG. 2, it is to be understood that the central layer 22 may consist of one or more layers of material. As presently shown, the central layer 22 preferably includes layer 24 and layer 26. It is to be understood that although only two central layers 24 and 26 are shown and described, the central layer 22 may include any number of layers to accomplish the strength and filtering quality of the filter bag.

The outer layer 18 is sometimes referred to as the exterior jacket or screen, wherein the layer 20 is referred to as the inside layer, and thus would be the inside of the filter bag, whereas layer 18 would be the exterior portion of the filter bag, and thus the layer 24, being proximate layer 18, may be referred to as the downstream layer, with layer 26 being referred to as the upstream layer.

The space between the dimples 16 is not critical and it is preferably approximately 3 inches between dimples in the longitudinal direction 28 and in the transverse direction 30 may be as small as one inch (2.54 cm). Here again, the spacing between the dimples in the longitudinal direction, shown by axis 32 may vary and the exact dimensions may be determined by experimentation, since it relates to the fiber strength of each of the laminated layers and the strength to be obtained for the laminated filter bag.

In the embodiment shown in FIG. 2, excellent results have been obtained by using Snopro 20 non-woven spun bond polypropylene two oz. 125 air perm material for the exterior jacket 18; with the downstream, or layer 24 material, being fabricated from melt-blown poylpropylene Ergon non-woven part No. 6011030; the upstream layer 26 material being fabricated from melt-blown polypropylene Ergon non-woven No. 6061017; and the inside layer 20 material being manufactured by Reemay Typar polypropylene, part No. T-135 spunbond material 1.6 oz. air permeability (perm) 250 cubic feet per minute (cfm). This combination has been found to give excellent results for filter bags for the specifications of 2.5 microns, and would be considered to be of high efficiency. Although the present embodiment is described with regard to the subject material sample, it is to be understood that this is merely only one example of what can be used.

The materials described herein manufactured by Ergon may be purchased from Ergon Nonwovens, Inc., Jackson, Miss. and the materials manufactured by Reemay Typar may be purchased from the Snow Filtration Company, Cincinnati, Ohio.

Hereinbefore has been disclosed a seamless laminated filter bag suitable for use in a pressurized filter system. It will be understood in the details, material, arrangement of parts, and operating conditions, which have been herein described and illustrated in order to explain the nature of the invention, may be made by those skilled in the art within the principle and scope of the instant invention.

Having thus set forth the nature of the invention, what is claimed is:

1. A multi-layer laminated filter material comprising:
    a) an outer layer of non-woven filter material;
    b) an inner layer of non-woven filter material;
    c) a central layer of at least one layer of melt blown filter material devoid of any material having layers of longitudinal continuous filaments; and
    d) non-piercing means utilized throughout and spaced at intervals across the surface of said filter material for binding said outer layer of filter material and said inner layer of filter material together.

2. Seamless filter bags comprising:
    a) a semi-rigid ring member; and
    b) laminated fluid permeable filter material formed by heat means in the shape of a bag affixed to said semi-rigid ring member by heat means, said laminated filter material including;
        i) an outer layer of non-woven filter material;
        ii) an inner layer of non-woven filter material; and
        iii) non-piercing means disposed about the surface of said fluid permeable filter material for binding said outer layer of filter material and said inner layer of filter material together.

3. A multi-layer laminated filter material according to claim 1, wherein said non-piercing binding means is concentrated heat applied to the surface of said multi-layer filter materials and said heat causes the bonding of said materials where said heat is applied.

4. A multi-layer laminated filter material according to claim 3, wherein said concentrated heat is applied at spaced intervals along the length of the surface of said multi-layer filter materials.

5. A multi-layer laminated filter material according to claim 3, wherein said concentrated heat is applied at spaced intervals along the width of the surface of said multi-layer filter materials.

6. A multi-layer laminated filter material according to claim 3, wherein said concentrated heat has a circular imprint.

7. A multi-layer laminated filter material according to claim 3, wherein said concentrated heat has a circular imprint of ¼ of an inch (0.635 cm) in diameter or less.

8. A multi-layer laminated filter material according to claim 3, wherein said non-piercing binding means is concentrated heat that forms a repetitive pattern along the surface of said multi-layer filter material.

9. Seamless filter bags according to claims 1 or 2, wherein said laminated filter material comprises:
    a) a first outer layer of non-woven spun bond polypropylene;
    b) a first inner layer of non-woven melt-blown polypropylene;
    c) a second inner layer of non-woven melt-blown polypropylene; and
    d) a second outer layer of spun-bond polypropylene.

10. Seamless filter bags according to claims 1 or 2, wherein said laminated filter material comprises:
    a) a first outer layer of non-woven spun bond polypropylene two oz.; 125 air perm;
    b) a first inner layer of non-woven melt-blown polypropylene;
    c) a second inner layer of non-woven melt-blown polypropylene; and
    d) a second outer layer of spun-bond polypropylene 1.6 oz.; air perm 250 cfm.

11. Seamless filter bags according to claim 2, further including a central layer of flud permeable filter material.

12. Seamless filter bags according to claim 11, wherein said central layer of filter material consists of more than one layer of material.

13. Seamless filter bags according to claims 11 or 12, wherein said more than one central layer of filter material consists of non-woven material.

14. Seamless filter bags according to claims 11 or 12, wherein said more than central layer of filter material consists of at least one layer of non-woven material.

15. Seamless filter bags according to claims 11 or 12, wherein said more than one central layer of filter material consists of at least one layer of woven material.

16. Seamless filter bags according to claims 11 or 12, wherein said more than one central layer of filter material consists of more than one layer of woven material.

17. Seamless filter bags according to claim 11 or 12, wherein said more than one central layers of filter material consists of more than one layer of non-woven material.

18. Seamless filter bags according to claim 2, wherein said non-piercing binding means is concentrated heat applied to the surface of said multi-layer filter materials and said heat causes the bonding of said materials where said heat is applied.

19. Seamless filter bags according to claim 18, wherein said concentrated heat is applied at spaced intervals along the length of the surface of said multi-layer filter materials.

20. Seamless filter bags according to claim 18, wherein said concentrated heat is applied at spaced intervals along the width of the surface of said multi-layer filter materials.

21. Seamless filter bags according to claim 18, wherein said concentrated heat has a circular imprint.

22. Seamless filter bags according to claim 2, wherein said concentrated heat has a circular imprint of ¼ of an inch (0.635 cm) in diameter or less.

23. A multi-layer laminated filter material for use in seamless filter bags comprising:
   a) an outer layer of non-woven filter material;
   b) an inner layer of non-woven filter material;
   c) a central layer of more than one layer of filter material with at least one layer consisting of woven material; and
   d) non-piercing means utilized throughout and spaced at intervals across the surface of said filter material for binding said outer layer of filter material and said inner layer of filter material together.

\* \* \* \* \*